United States Patent [19]
Petler

[11] Patent Number: 6,081,519
[45] Date of Patent: *Jun. 27, 2000

[54] IN-HOME COMMUNICATION SYSTEM

[75] Inventor: Scott C. Petler, Sebastopol, Calif.

[73] Assignee: Next Level Communications, Rohnert Park, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/621,573

[22] Filed: Mar. 25, 1996

[51] Int. Cl.[7] .................................................. H04J 3/02
[52] U.S. Cl. .......................... 370/356; 370/398; 370/422; 370/489
[58] Field of Search ...................... 370/321, 326, 370/336, 337, 395, 397, 399, 401, 404, 409, 396, 398, 422, 425, 442, 458, 498, 356, 485, 486, 487, 489, 490

[56] References Cited

U.S. PATENT DOCUMENTS

| | | | |
|---|---|---|---|
| 4,183,054 | 1/1980 | Patisaul et al. | 358/86 |
| 4,365,249 | 12/1982 | Tabata | 340/825.3 |
| 4,538,174 | 8/1985 | Gargini et al. | 358/86 |
| 4,641,363 | 2/1987 | Hasegawa | 455/4 |
| 4,899,217 | 2/1990 | MacFadyen et al. | 358/86 |
| 4,989,081 | 1/1991 | Miyagawa et al. | 358/93 |
| 5,056,086 | 10/1991 | Libonati | 370/259 |
| 5,093,718 | 3/1992 | Hoarty et al. | 358/84 |
| 5,130,793 | 7/1992 | Bordry et al. | 358/86 |
| 5,144,619 | 9/1992 | Munter | 370/353 |
| 5,307,344 | 4/1994 | Mueller et al. | 370/397 |
| 5,343,462 | 8/1994 | Sekihata et al. | 370/409 |
| 5,345,558 | 9/1994 | Opher et al. | 359/200.15 |
| 5,351,234 | 9/1994 | Beierle et al. | 370/307 |
| 5,363,433 | 11/1994 | Isono | 379/92 |
| 5,365,264 | 11/1994 | Inoue et al. | 348/10 |
| 5,392,402 | 2/1995 | Robrock, II | 370/399 |
| 5,421,030 | 5/1995 | Baran | 455/5.1 |
| 5,440,547 | 8/1995 | Easki et al. | 370/395 |
| 5,519,690 | 5/1996 | Suzuka et al. | 370/395 |
| 5,594,789 | 1/1997 | Seaholtz et al. | 379/207 |
| 5,600,469 | 2/1997 | Yamazaki | 359/135 |
| 5,677,905 | 10/1997 | Bigham et al. | 340/825.06 |

*Primary Examiner*—Ricky Ngo
*Assistant Examiner*—Kwang B. Yao
*Attorney, Agent, or Firm*—J.P Blasko Professional Corp.; John P. Blasko; Charles A. Eldering

[57] ABSTRACT

A method and apparatus for an in-home communication system based on the use of a telecommunications terminal of a Fiber-to-the-Curb (FTTC) network is described. In this system signals are sent from a first device in a home to the FTTC terminal over a subscriber coaxial cable network, and routed from the telecommunications terminal back to the home, where they are received by a second device in the same home. Signals are routed back to the home at the telecommunications terminal by recognizing a particular address which corresponds to in-home signals or by timing information. In the event that the information is contained within Asynchronous Transfer Mode (ATM) cells, the Virtual Path Identifier (VPI) field of the ATM cells can be used to indicate that cells are to be redirected back to the home.

20 Claims, 6 Drawing Sheets

IN-HOME COMMUNICATION SYSTEM

BACKGROUND OF THE INVENTION

Numerous types of networks have been developed to provide communications between physically distinct locations including long distance phone networks, wide area networks for data interconnects over medium and long distances, and local area networks for connections between users in a business or campus environment. Because the number of electronics devices in the home and their computing power is constantly increasing, there is also a need to interconnect these devices, which may be computer based (e.g. personal computers, or appliances containing computers) or entertainment based (e.g. stereos or televisions).

In-home networks can be created by connecting devices using existing twisted pair wiring in the home. The in-home twisted pair is typically a copper wire bus structure which is presently used to distribute telephone service throughout the home. In typical homes the twisted pair bus exhibits limitations in terms of both the information carrying capacity as well as the number of twisted pairs which exist in the home which can be used to support in-home communications.

The coaxial cable in the home could also be used as an interconnect media, but is typically connected to a passive splitter which does not have electrical characteristics appropriate for in-home device-to-device connections. In addition, the coaxial cable in the home is almost exclusively used for distribution of cable TV signals and thus has a spectrum which is largely occupied.

In the area of telecommunications, there have been advances in Fiber-to-the-Curb (FTTC) technology. FTTC technology is based on the use of telecommunications terminals called Broadband Network Units (BNUs) which are located near the subscriber homes and are connected to the telephone central office via optical fibers. Connections from the BNU to the subscriber home are made via a coaxial cable and/or copper twisted pair cable. These FTTC systems are capable of delivering video, voice and data signals to devices in the home, and will typically use the Asynchronous Transfer Mode (ATM) standard to provide these various services from one single data stream.

The FTTC network is capable of providing traditional phone service as well as advanced data and video services including Video on Demand (VOD) which will allow the consumer to choose from a multitude of video programs, and fast forward and rewind through the program. However, present FTTC networks do not support connections between devices in the home. In order to send data from a computer to a printer or a television in the home, it is still necessary to have dedicated cables, or complex wireless or infrared connections between the devices.

For the foregoing reasons there is a need to have a communications system which supports traditional telecommunications services as well as advanced and video and data services, but which can also interconnect in-home devices.

SUMMARY OF THE INVENTION

The present invention is a method and an apparatus for in-home communications in which information is transmitted from a first in-home device over a transmission media such as twisted pair cable or a subscriber coaxial cable network to a remotely located broadband network unit, routed in the broadband network unit based on a routing indicator in the information, and transmitted from the broadband network unit to a second in-home device. The broadband network unit may support telecommunications services, therefore a portion of the communications infrastructure including the broadband network unit and twisted pair or subscriber coaxial cable network may already be in place to provide those services, and the infrastructure can be readily used to provide connectivity between devices in the home.

An alternate embodiment is the use of timing information in the data stream transmitted from an in-home device to provide the routing function at the broadband network unit. In this embodiment, information arriving at the BNU from the first in-home device is routed back to the home or to the Public Switched Telecommunications Network (PSTN) based on when it arrives, the time of arrival indicating the destination.

The invention may be realized in a FTTC network in which the broadband network unit provides bi-directional telecommunications services by transmitting information on the subscriber coaxial cable network using Time Division Multiplexed (TDM) signals modulated onto a downstream carrier frequency, and using a Time Division Multiple Access (TDMA) protocol with the information being modulated onto a return carrier frequency for the upstream. Information from the devices can be transmitted in the form of Asynchronous Transfer Mode (ATM) cells, and the routing information can be contained within the Virtual Path and Virtual Channel Identifier (VPI/VCI) fields of the ATM cells. Information sent from a first in-home device which is destined for a second in-home device is received at a broadband interface unit card at the BNU and redirected back down the subscriber coaxial network to the second in-home device.

One advantage of the present invention is that the devices in the home can utilize the subscriber coaxial cable network for in-home communications, in spite of the fact that the in-home coaxial network is not well suited for sending signals directly from one device to another. This is due to the fact that the splitters in the home which allow cable TV signals to be distributed within the home are designed to exhibit low reflections for signals coming from within the home, thus a signal sent from a device in the home can reach a terminal on the other side of the splitter, but only a small amount of signal arrives at another device in the home. This signal level is quite small as compared to the signal level arriving from the BNU, thus the receiving devices require an extremely large dynamic range. In contrast, the present invention only requires that one power level be established for communications with the BNU.

Because the subscriber coaxial cable network is well suited for sending and receiving signals from device in the home to and from a remotely located terminal, an efficient and robust communications link can be established between the devices in the home by using the terminal.

Another advantage of the present invention is that since the telecommunications terminal which supports telecommunications services contains hardware and software for routing of signals and determining what communications resources are available, there is little additional equipment required to provide in-home connections. Similarly, devices in the home which utilize the telecommunications network and telecommunications terminal can be used to establish in-home connections with little modification.

FTTC systems based on the use of ATM communications standards to route cells and control bandwidth and resource utilization by devices on the network have the capability to perform the same functions for the allocation of bandwidth to in-home devices and the routing of cells from one in-home device to another. In the present invention, the BNU can perform these functions for the ATM cells destined for the PSTN and can therefore also perform these functions for in-home devices by supporting communications from one in-home device to another.

Since the goal of an in-home communications system is to establish connections between devices in the home it is not intuitive to send signals out of the home to a remotely located terminal and retransmit them back into the home. Therefore, my present invention exhibits many advantages over other complex in-home digital networks which route signals through the home based on complicated standards and a wiring and connector system which does not exist in most homes.

A method and apparatus for an in-home communication system based on the use of a telecommunications terminal of a Fiber-to-the-Curb (FTTC) network is described. In this system signals are sent from a first device in a home to the FTTC terminal over a subscriber coaxial cable network, and routed from the telecommunications terminal back to the home, where they are received by a second device in the same home. Signals are routed back to the home at the telecommunications terminal by recognizing a particular address which corresponds to in-home signals or by timing information. In the event that the information is contained within Asynchronous Transfer Mode (ATM) cells, the Virtual Path Identifier (VPI) field of the ATM cells can be used to indicate that cells are to be redirected back to the home.

DESCRIPTION OF PREFERRED EMBODIMENTS

Fiber-to-the-Curb Networks

Figure 1:
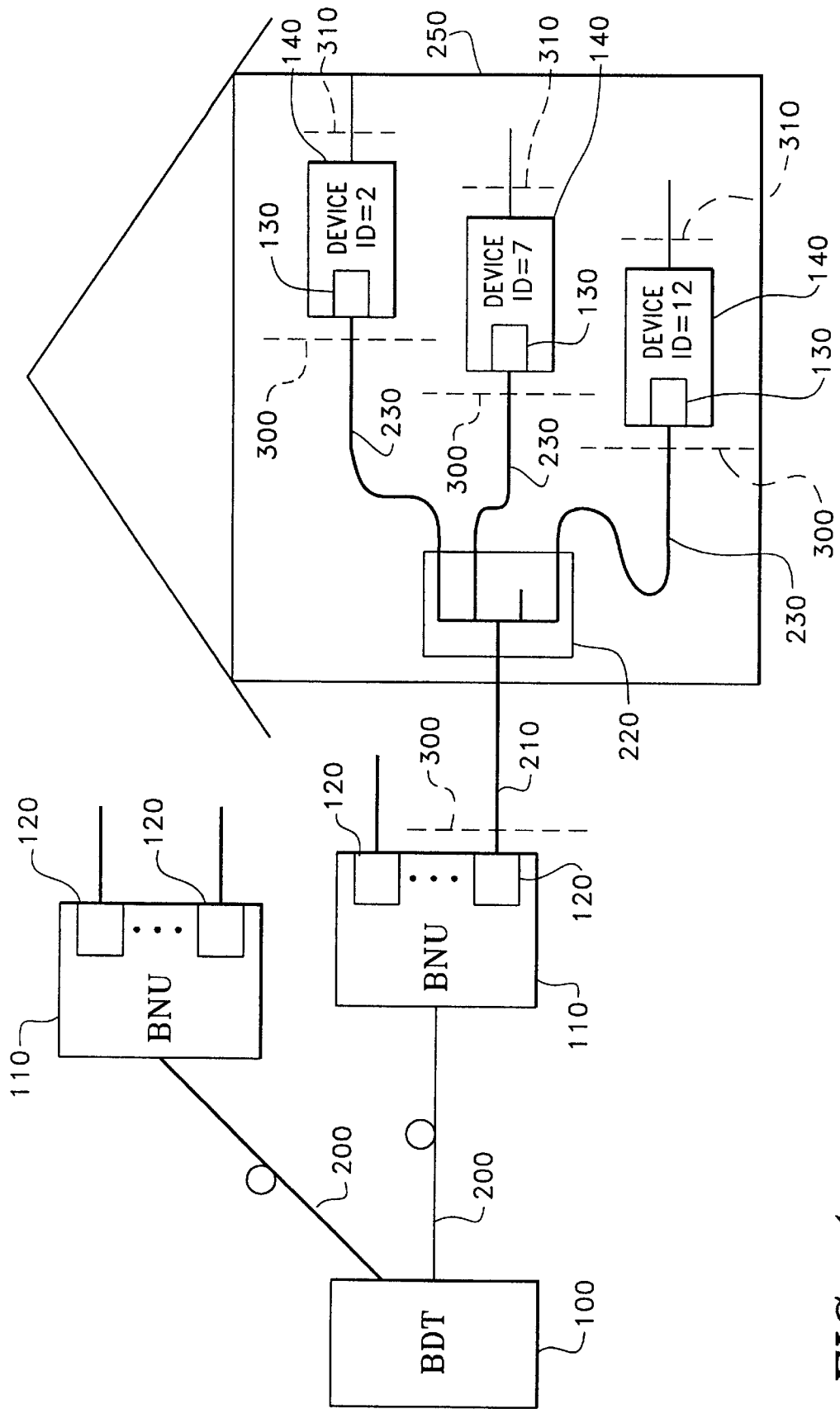
FIG. 1 shows a Fiber-to-the-Curb network with a point-to-multipoint subscriber coaxial cable network connecting the Broadband Network Unit (BNU) with devices in the home.

FIG. 1 illustrates a Fiber-to-the-Curb (FTTC) network which delivers telecommunications services to a home (250). Services are provided in the FTTC network shown in FIG. 1 via a Broadband Digital Terminal, BDT (100), which is connected to a Broadband Network Unit, BNU (110), via at least one optical fiber (200). The connection to the home (250) is made by a Broadband Interface Unit, BIU (120) which is connected by a coaxial drop cable (210) to a splitter (220) which is connected to at least one device (140) via in-home coaxial cable (230). Each device contains a device physical layer transceiver (130). The relevant interfaces for this network are illustrated in FIG. 1 and are the UNI interface (300) and the UTOPIA interface (310). A telephony interface may also be included in addition to the UTOPIA interface (310). Multiple UTOPIA interfaces (310) are possible, connecting to one or more pieces of customer premise equipment.

The BNU (110) is a telecommunications terminal which is connected to a BDT (100) via an optical fiber (200). The BNU (110) contains a number of printed circuit boards: a power supply, a common control board which typically has a microprocessor for controlling the other cards in the BNU (110) and electro-optic devices for communicating with the BDT (100); line cards which are for providing traditional phone services over twisted pair cable; and BIUs (120) for communicating to and from devices (140) in the home (250) over a subscriber coaxial cable network.

In a FTTC system, telecommunications services are supported by connecting the BDT (100) to a PSTN. This connection is usually in the form of a standard interface between a central office switch and the BDT, examples of which include Bellcore TR-008 and TR-303. Telecommunications services including Plain Old Telephony service (POTs) and Integrated Service Digital Network (ISDN) services can be supported by routing phone calls from the switch to the BDT, to the BNU (110) and to the home (250) over a transmission media such as twisted pair and directly to the phone or over coaxial cable, to a device (140) and then to a phone. In this way the FTTC system is used to provide phone services.

In the event that the transmission media is twisted pair cable, the twisted pair runs from the BNU (110) to the home (250) and to the different phone outlets in the home in a bus fashion, with each phone outlet being connected to the same twisted pair.

In the event that the transmission media is coaxial cable, as shown in FIG. 1, a subscriber coaxial cable network is formed by a coaxial drop cable (210) connected to at least one splitter (220) which provides for the dividing of the signal power in the downstream direction and the summing of the power in the upstream direction. The multiple outputs of the splitter are connected to the in-home coaxial cable (230). The most common form of coaxial cable wiring in the home is point-to-point from each outlet to the splitter (220). Devices (140) are connected to the in-home coaxial cable (230) via the outlet or directly to the in-home coaxial cable (230). Although the splitter is typically near the entry point of the drop cable, the subscriber coaxial cable network may be comprised of a drop cable and several splitters which are located throughout the home (250), but form the same bus type architecture in which the signal in the downstream is received by all devices (140), and all devices (140) transmit signals which are summed onto the coaxial drop cable (210).

The splitter (220) is typically a passive device which provides the function of dividing the power in the downstream direction, providing the signal power to two or more outputs which are connected to the in-home coaxial cable (230), and summing the signals from devices (140) in the upstream direction. Alternatively, the splitter may be an active device which performs amplification of the signals. The splitter is generally characterized by the fact that is does not perform switching or routing of signals, and only the dividing of signal power in the downstream direction and summing of signals in the return direction, with the possibility of amplifying signals in either direction.

Asynchronous Transfer Mode Used in a FTTC Network

Because the connection between the BNU (110) and BDT (100) is typically via fiber optic cable which has an extremely large data carrying capacity, many other services besides POTs can be supported. In particular, the high speed transport of voice, video and data using the Asynchronous Transfer Mode (ATM) communications standard can be supported over the FTTC platform. The BDT (100) can have a connection to a public or private ATM network, and end-to-end connectivity for a large number of applications can be provided by the FTTC system and ATM networks. As defined here, the PSTN includes both the traditional phone system based on isochronous transport and a public ATM network based on asynchronous transport.

In using the ATM communications standard to transport information, standard physical interfaces such as the User Network Interface, UNI (300), and the Universal Test & Operations Physical Layer Interface for ATM, UTOPIA (310) can be utilized. It is envisioned that customer premise equipment including televisions, television settops, personal computers, and peripherals such as printers, compact disc or laser disc players will have a UTOPIA interface (310) which allow them to communicate using the ATM communications standard. More than one UTOPIA interface (310) may be present between the device (140) and the customer premise equipment and will allow ATM cells destined for the PSTN to be sent over one UTOPIA interface (310), and ATM cells destined for another in-home device to be sent over another UTOPIA interface (310).

Figure 2:
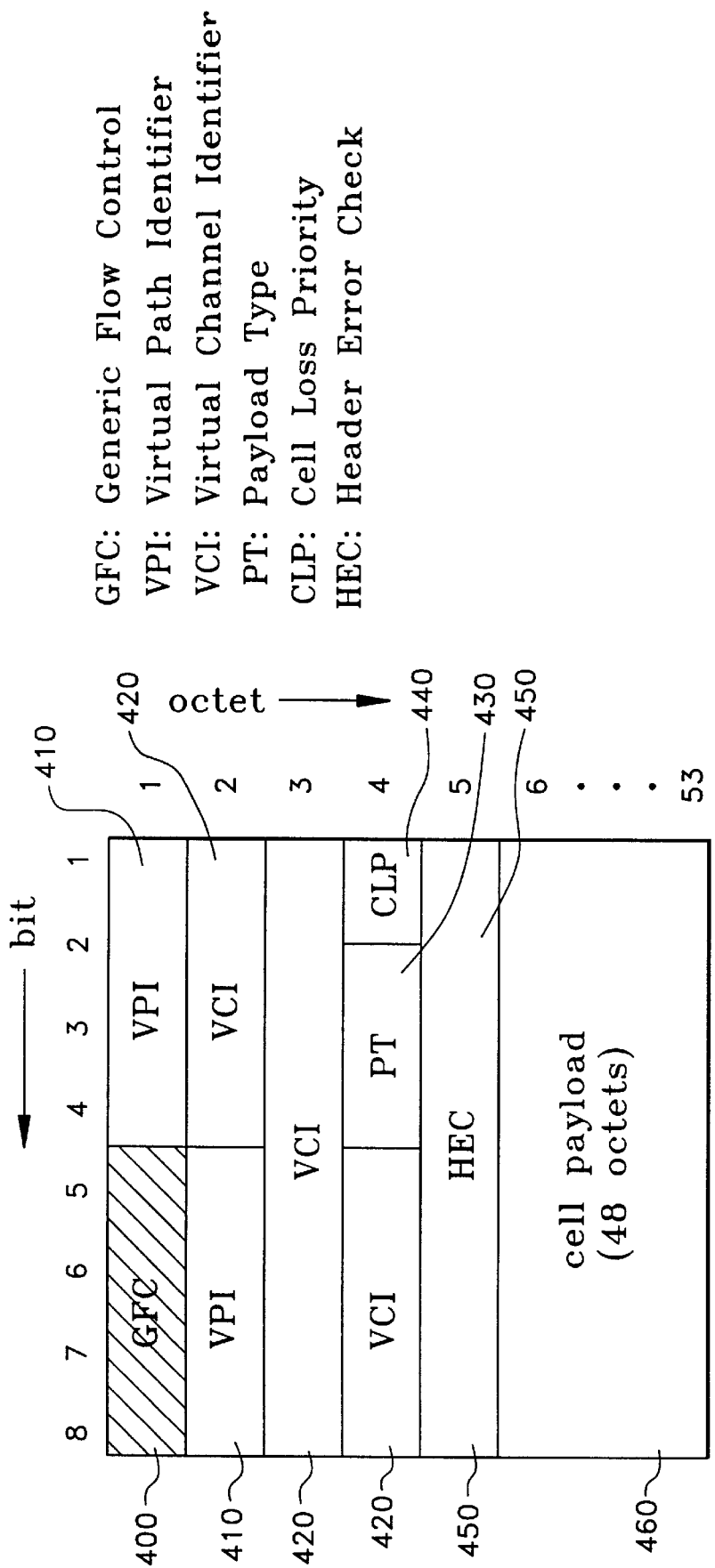
FIG. 2 shows an ATM cell and the fields within the cell.

The ATM communications standard is based on the use of cells, the content of which is illustrated in FIG. 2 where a 53 octet ATM cell is shown and the fields defined: the Generic Flow Control field, GFC (400), the Virtual Path Identifier field, VPI (410), the Virtual Channel Identifier field, VCI (420), the Payload Type field, PT (430), the Cell Loss Priority field, CLP (440), the Header Error Check field, HEC (450) and the cell payload (460).

Consumer premise equipment supporting the ATM communications standard can be connected with the network via network interface or premise interface devices, referred to here simply as devices (140). The devices may be owned and operated by the network operator, in which case they will typically be located on the outside of the home. These devices may include circuitry to provide telephone service, with the interface being a telephone jack such as the industry standard RJ-11. The device may be inside the home (250) and may provide connectivity to a computer via an Ethernet connection or to a television via a yet to be determined standard. For the connection to the network, the devices can utilize the UNI interface (300). This standard includes procedures and protocols for establishing logical connections on the network.

From the preceding description, it can be seen that the FTTC network can support a wide range of telecommunications services which include POTs, Integrated Services Digital Network (ISDN), and services which utilize the ATM communications standard as a means of transporting data. The FTTC network provides the means to interconnect customer premise equipment such as telephones with the PSTN for traditional telecommunications services such as POTs, as well as connecting computers with ATM networks for newer services such as Video on Demand (VOD), work-at-home applications, high speed Internet access, and video conferencing.

Establishing a Connection

A goal of the present invention is to allow devices in a home (250) to communicate with each other. This can be accomplished by transmitting information from a first device in the home (250) to the BNU (110) over twisted pair cable or a subscriber coaxial cable network, indicating through the use of a routing indicator that the information is destined for a second device in the same home (250), and directing the information back down the twisted pair cable or subscriber coaxial cable network where it will be received by the second device in the home.

In order to establish a connection between in-home devices, a device (140) in the home (250) must request permission from the system to transmit information. This can be accomplished by requesting bandwidth from the BNU (110), which can determine if there is transmission capacity on the twisted pair cable or subscriber coaxial cable network. The algorithm to perform this may be a simple determination that the total data rate of the Constant Bit Rate (CBR) services allocated to the rest of the devices is below the capacity of the system and that the requesting device can be allocated a CBR bandwidth up to a data rate at which the system capacity is met. More complex algorithms including Variable Bit Rate (VBR) and Available Bit Rate (ABR) determinations can be used, in which case the requesting device will not receive a fixed bandwidth but will instead receive a variable bandwidth dependent on the usage of the system resources by the other devices.

The signaling used to set up the connection can be based on the Q.2931 protocol, a subset of this protocol, or another signaling protocol. The signaling protocol allows the device requesting the connection (the calling device) to signal to the BNU that it desires to route data to a second device (the called device), and the device requests a data rate if the default data rate is not sufficient. The BNU, upon receiving the message, establishes the call, and assigns VPI/VCI values to that call, as well as determining the data rate which is handled by the connection. A message is sent to the calling device indicating that data is sent, and the device begins to send the information with the appropriate VPI/VCI, resulting in the data being routed back to the home. If the VPINCI is bi-directional, as in the ATM communications standard, the called device transmits data to the calling device simultaneous with transmission of data from the calling device to the called device. As previously disclosed, the bi-directional VPI/VCI will allow routing to occur at the BNU through the use of the VPI, VCI, or combination of VPI/VCI fields, but will require additional addressing so that devices can distinguish information destined for them from information which they have transmitted.

Bandwidth control can be accomplished by the use of a grant table and grants. Grants are signals sent to a device (140) which indicate that that device has permission to transmit an upstream cell from the device (140) to the BNU (110). The grant table is typically located in the BDT (100) with a copy being maintained in the BNU (110). When supporting communications from a device to the PSTN, the role of the grant table is to periodically issue grants to a device (140) which can then transmit its cells on the subscriber coaxial cable network. The BNU (110) then transmits the cell to the BDT (100) over the optical fiber (200) and once received at the BDT the cell is routed into the PSTN, which may be an isochronous network or an ATM network.

For CBR services, the grant table will be such that grants are issued to a particular device periodically so that the bit rate required for that device is maintained. VBR and ABR services can also be supported using the grant table, with the grants being issued to the devices (140) when there is bandwidth available. The BDT (100) assures that the number of grants issued is not greater than the data carrying capacity of the optical fiber (200) or the data rate on the coaxial drop cable (210).

Because the available bandwidth on the subscriber coaxial cable network in the upstream direction from the devices (140) to the BNU (110) may be greater than the available bandwidth on the BNU (110) to BDT (100) connection, there can be excess bandwidth on the subscriber coaxial cable network which can be used for in-home communications.

As an example, if the available bandwidth from a home (250) on a subscriber coaxial cable network is 51.84 Mb/s and eight homes are served from a BNU (110) which transmits to a BDT (100) at a rate of 155.52 Mb/s, the total data rate from all of the homes is 414.72 Mb/s, of which only 155.52 Mb/s can be transmitted to the BDT. As a result of this, the BDT only allocates grants to devices in all of the homes served by that BNU such that the total data rate on the optical fiber (200) is 155.52 Mb/s or less. Additional grants can be issued to devices (140) for in-home communications, so long as these grants are not used for transmissions from the BNU (110) to the BDT (100).

The BDT (100) can issue grants for in-home communications by marking grants for in-home communications with an additional bit which is set to a logical '1' to indicate that the grant is intended for in-home communications and not communications from the device (140) to the BDT (100). The grants may be issued by the BDT (100), or the BNU (110) can be enabled to issue the grants. In either case the devices (140) receive grants with the additional bit set equal to '1' and recognize that those grants may be used to send data to another device on that subscriber coaxial cable network.

One of the advantages of the present invention is that data can simultaneously be transmitted from one device in the home to another while simultaneously being transmitted to the PSTN. This can be accomplished in the BNU (110) by routing cells with a particular VPI/VCI both down the subscriber coaxial cable network as well as to the BDT (100). This feature is useful for the simultaneous transmission of data from one device in the home to another while also transmitting it to another user on the PSTN. In this way a connection between in-home devices is established at the same time as a connection to the PSTN, either for isochronous services or for services based on the ATM communications standard.

Routing Methods

The routing indicator can be of many types, such as a prepended field to the ATM cell shown in FIG. 2 which contains one or more bits to indicate to the BNU that the information should be redirected to the home (250). Similarly, an appended field to the ATM cell shown in FIG. 2 can also be used to indicate that the information should be redirected to the home (250). A single bit in a prepended or appended field is sufficient, since the BNU, upon recognizing that bit, will redirect the information back to the home. Other fields are used by the receiving devices to determine that the information is for that particular device.

Fields within the ATM cell can also be used as the routing indicator. These fields, illustrated in FIG. 2, include the GFC field (400), the VPI field (410) and the VCI field (420), Payload Type field (430), Cell Loss Priority field (CLP), Header Error Check field (HEC), as well as bits within the cell payload (460). The VPI field (410) and VCI field (420) are addressing fields as defined in the ATM communications standard, and can be readily used as the routing indicator, since the BNU can have information related to the address of the home (250) and the devices (140) within the home.

The VPI field (410) and VCI field (420) can be used for routing individually or together. The VPI field (410) may be used if the BNU (110) assigns a VPI value to connections between devices (140) in the home (250) regardless of the VCI value. In this case a first device in the home (250) sends information on a particular VPI, and that VPI corresponds to a connection to a second device in the home (250). The BNU (110) routes cells with that VPI on that connection, which is from the home (250) back to the home (250).

Alternatively, the VCI field can be used alone to represent a connection between devices. In this case a first device in the home (250) sends information on a particular VCI, and that VCI is associated with the connection between the devices (140) in the home (250). The BNU (110) routes cells with that VCI back to the home.

If both fields are used together it is understood that the connection from a first device in the home to the second device in the home is established by using the VPI and VCI values together, and that the first device in the home transmits cells with a unique VPI/VCI which the BNU (110) associates with a connection between devices (140) in the home (250), and routes those cells with the unique VPI/VCI back to the home (250).

As an example of the use of the VPI for routing, VPI 12 is associated with a particular home, and a device in that home can send information in cells with a VPI value of 12 which the BNU simply routes back to the home, where they are received by all devices in that home. The destination device recognizes that the information is for that particular device by another addressing means such as the GFC field (400), Payload Type field (430), Cell Loss Priority field (CLP), Header Error Check field (HEC), as well as bits within the cell payload (460) or in a prepend or append. In this case all cells with VPI=12 are directed to the home, and the additional information is used to discriminate for which device the information is destined. The routing actually takes place through the use of the VPI, which the BNU recognizes as being associated with a home. In this case, the BNU does not determine for which device the information is destined, but only routes the information back to the home.

The additional addressing information which allows cells to be recognized as destined for a particular device in the home would typically be contained in the GFC field (400) in the ATM cell shown in FIG. 2. As will be apparent to one skilled in the art, a variety of combinations of fields may be used a routing indicators.

Broadband Interface Unit

Within the BNU (110) there exists a circuit board designated the BIU (120) which contains the necessary hardware to receive signals from the subscriber coaxial cable network and to control the devices (140) and in particular the device physical layer transceiver (130) located within each device (140). The device physical layer transceiver contains the RF and digital circuitry necessary to establish communications with the BIU. The BIU (120), being the interface to each subscriber coaxial cable network, processes the cells which arrive at the BNU (110) and determines if those cells are to be routed to the BDT (100). One advantage of the present invention is that the cells arriving up the subscriber coaxial cable network that are to be routed back to the home (250) do not need to leave the BIU (120) and can be directly rerouted back down the subscriber coaxial cable network to the home. In this way the other resources in the BNU (110) including backplane communications bandwidth are not utilized for in-home communications. Other elements included within the BNU (110), such as the common control, do not need to be involved with communications between in-home devices. Typically, each BIU (110) supports two homes on two subscriber coaxial cable networks. The BIU (110) does not contain a microprocessor, but relies on a microprocessor in the common control card in the BNU (110).

Timeslot Based Routing

An alternative to the use of a routing indicator is the use of timing information to determine the routing destination. In the case that the transmission from the multiple devices (140) in the home (250) to the BNU (110) is handled by the use of a Time Division Multiple Access (TDMA) protocol, there will be time slots assigned to each device (140) for transmission to the BNU (110). At the time that the timeslots are assigned to the devices, it can be determined that information in a particular timeslot is destined for another device in the same home (250). The information in those timeslots can be retransmitted back to the home (250) without interpretation of any routing bits or addresses, since the destination is known from the temporal location of the information.

Time Division Multiplexing/Time Division Multiple Access

The present invention can be realized based in part on the Digital Audio-Visual Council (DAVIC) specifications, and in particular DAVIC 1.0 Specification Part 08, Lower Layer Protocols and Physical Interfaces. This specification describes an FTTC system, and the DAVIC profile A describes a system with a bit rate of 51.84 Mb/s in the downstream (BNU to devices) and 19.44 Mb/s in the upstream (devices to BNU). A subscriber coaxial cable network can be used to connect the BNU (110) with the devices (140) in the home (250), since it provides a low-interference environment for the transmission of the information.

Figure 3:
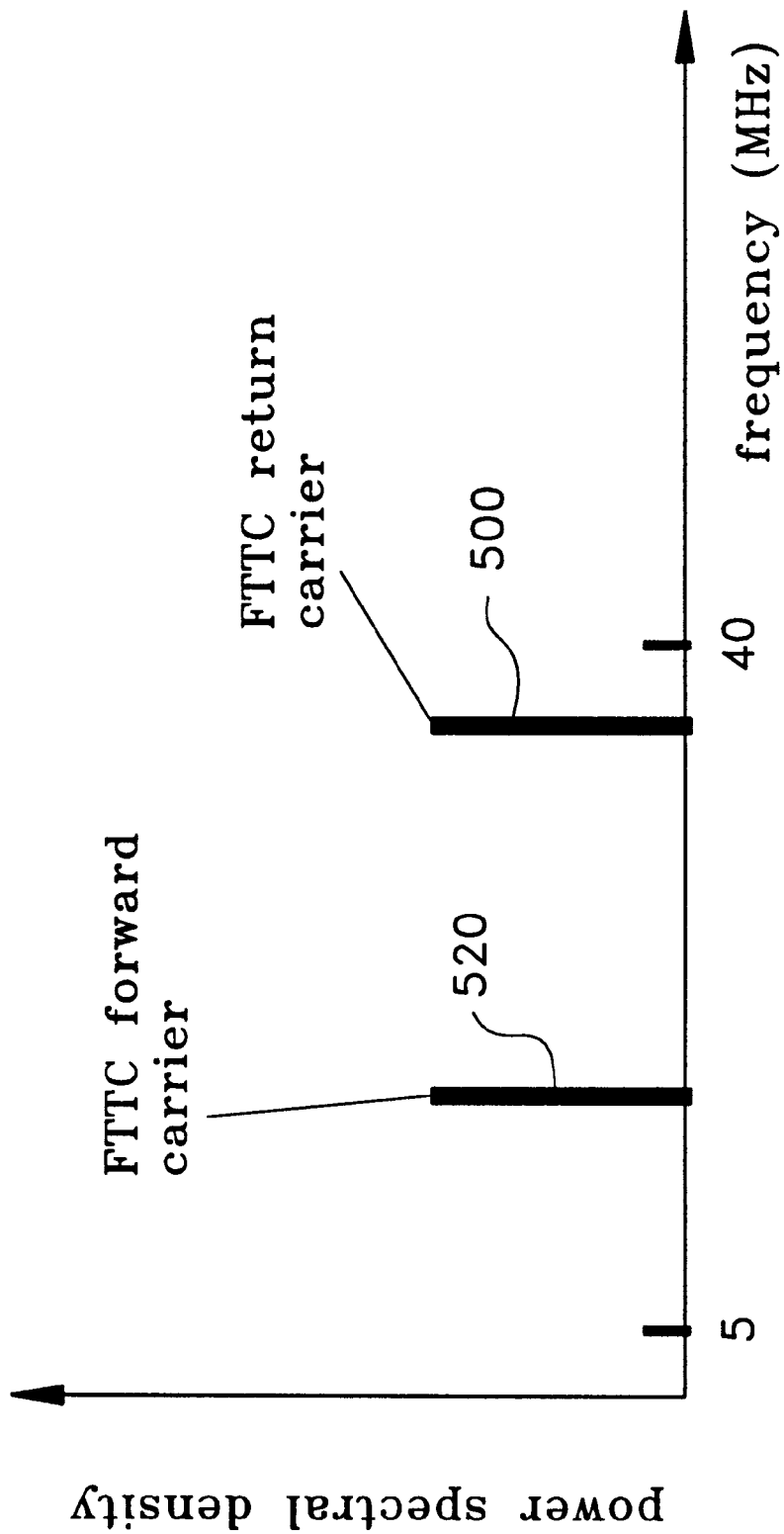
FIG. 3 shows the spectrum on the subscriber coaxial network.

The data can be transmitted in the downstream direction by using an RF carrier upon which digital data is modulated using 16 Quadrature Amplitude Modulation. As shown in FIG. 3, the downstream carrier with the modulated data is referred to as the FTTC forward carrier (520). In the upstream direction a RF carrier is modulated using Quadrature Phase Shift Keying modulation and is referred to as the FTTC return carrier (500) as shown in FIG. 3. In a preferred embodiment, these carriers are kept below 40 MHz, which allows the subscriber coaxial cable network to also be used for traditional cable TV services in the 50–750 MHz range of frequencies. Preferred frequencies are 38.88 MHz for the FTTC return carrier (500), and 19.44 MHz for the FTTC forward carrier (520). An alternative frequency for the FTTC forward carrier (520) is 622.08 MHz, which still allows for a cable TV spectrum extending to at least 550 MHz.

The information can be sent in the downstream direction using Time Division Multiplexing (TDM) in which information for multiple devices is interleaved in the downstream bit stream. This information can be contained within ATM cells. In the upstream direction, a Time Division Multiple Access (TDMA) protocol is used in which each device (140) is assigned timeslots for the transmission of information to the BNU (110).

Figure 4:
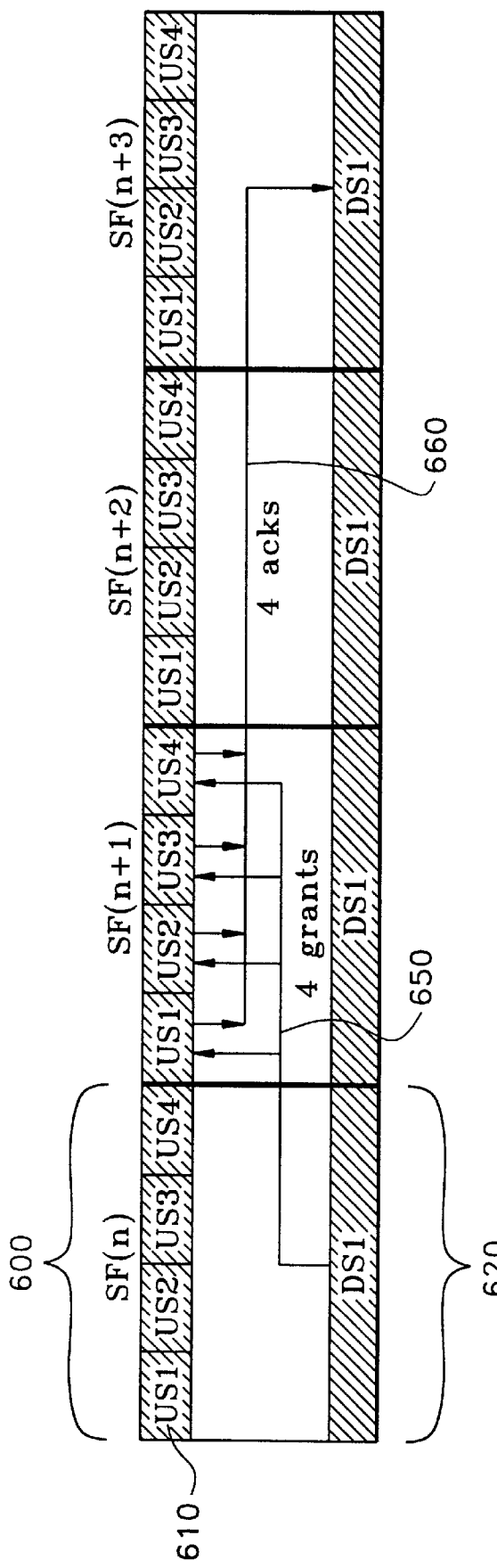
FIG. 4 shows the downstream and upstream frame and superframe structures.

The timing and structure of the downstream and upstream transmissions are described by a frame structure. The downstream and upstream frame and superframe structures are illustrated in FIG. 4, with the superframe (600) being comprised of upstream frames (610) and downstream frames (620). As illustrated in FIG. 4, grants (650) are issued in the downstream frames (610) to indicate the availability of an upstream frame for transmission from a device (140). A frame corresponds to an ATM cell with prepends and appends. If the upstream bursts are properly received, acknowledgments (660) that the upstream cells were received are transmitted in the downstream frame (610) two superframes (600) after they are transmitted. In the preferred embodiment, there are four upstream frames (bursts) and one downstream frame in a superframe, as illustrated in FIG. 4.

Figure 5:
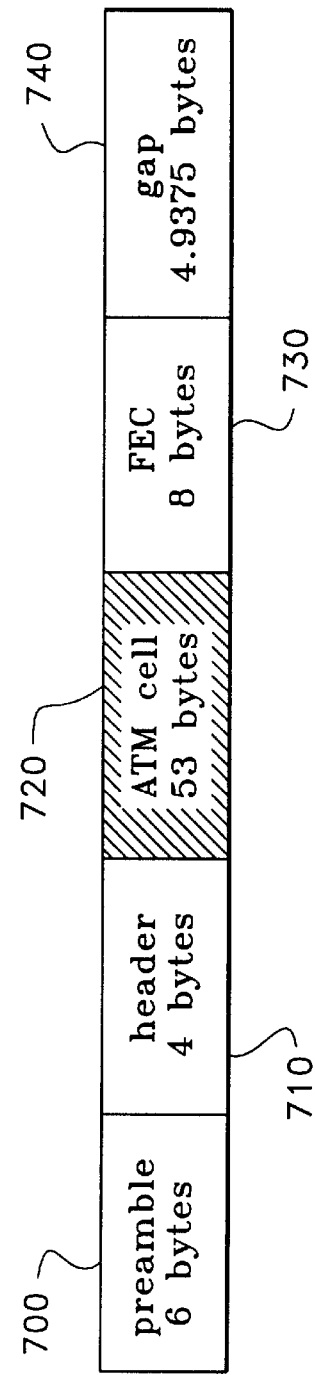
FIG. 5 shows the upstream burst structure.

FIG. 5 illustrates the format for an upstream frame (burst) consisting of a preamble (700), a header (710), an ATM cell (720) as in FIG. 2, forward error correction, FEC (730) and a gap (740). This results in a frame length of 75.9375 bytes. The downstream transmission format is also based on the use of ATM cells such as that shown in FIG. 2.

In operation, a device (140) is powered with no transmissions occurring during power-on. The device (140) acquires a downstream TDM signal from the forward FTTC carrier (520) and waits for an empty ATM cell opportunity. The device (140) transmits a sign-on cell to the BIU (120) during an unused ATM cell opportunity, and waits for an acknowledgment from the BIU (120) which arrives in a downstream payload area known as the datalink channel. Upon receiving an acknowledgment from the BNU (120), the device (140) knows which TDM information is designated for that device (140). The device (140) is also assigned a request timeslot on the return link to allow it to ask for timeslots for the transmission of data to the BIU (120).

Currently, up to 13 devices (140) can be supported in a home (250), and the preferred mechanism for distinguishing between devices in the home is the use of the bits in the GFC field (400) in the ATM cells shown in FIG. 2. In the downstream direction the value contained in the GFC field (400) indicates for which device the ATM cell is destined.

In the upstream direction, the device (140) requests grants (650) from the BNU (110) in the request timeslot. The BNU (110) in conjunction with the BDT (100) determines which timeslots are available based on the data rate requested, and on the communications resources (bandwidth) available both on the optical fiber (200) and the subscriber coaxial network. Assuming that there is bandwidth available, grants (650) are assigned when requested by the device. The mechanism used is based on Constant Bit Rate (CBR) services, so that the requesting device (140) is periodically issued a grant by the BNU (110).

To establish a connection between two devices in a home (250), a first device requests a connection by signaling to the BNU (110) that it wants to connect to a second device in the home (250). The BNU (110) relays this request to the BDT (100), which has information with respect to the allocation of grants (650) to all of the devices (140) in all of the homes (250) served by that BDT. The BDT (100) communicates the amount of bandwidth available for in-home communications on that subscriber coaxial cable network to the BNU (110), which allocates bandwidth to those devices by assigning grants (650) to both devices to allow them to transmit upstream, and allocates cells in the downstream TDM data stream. The BNU (110) also assigns a VCI within the VPI associated with that subscriber coaxial cable network.

Referring to FIG. 1, if device with ID=2 requests communication with device with ID=7, the BIU (120) may assign VCI=10 on VPI=3 for that communication. Device ID=2 can then transmit cells with a GFC=7, VPI=3, VCI=10. The BIU (120) upon receiving those cells with a VPI=3 will simply route those cells back down the subscriber coaxial cable network, where they will be recognized by the device with ID=7. Similarly, the device with ID=7 can transmit cells upstream with a GFC value=2, VPI=3, and VCI=10. The VPI=3 will cause the cells to be routed back down the subscriber coaxial cable network where they will be received by all of the devices, and recognized by the device with ID=2. In this way the routing is accomplished by the use of the VPI field (410). The VCI field (420) may be used by the customer premise equipment connected to the devices across the UTOPIA interface (310) for routing of signals to another in-home device, without knowledge of the device ID of the receiving device. The value in the GFC field (400) is used within the FTTC access system for addressing purposes.

Figure 6:
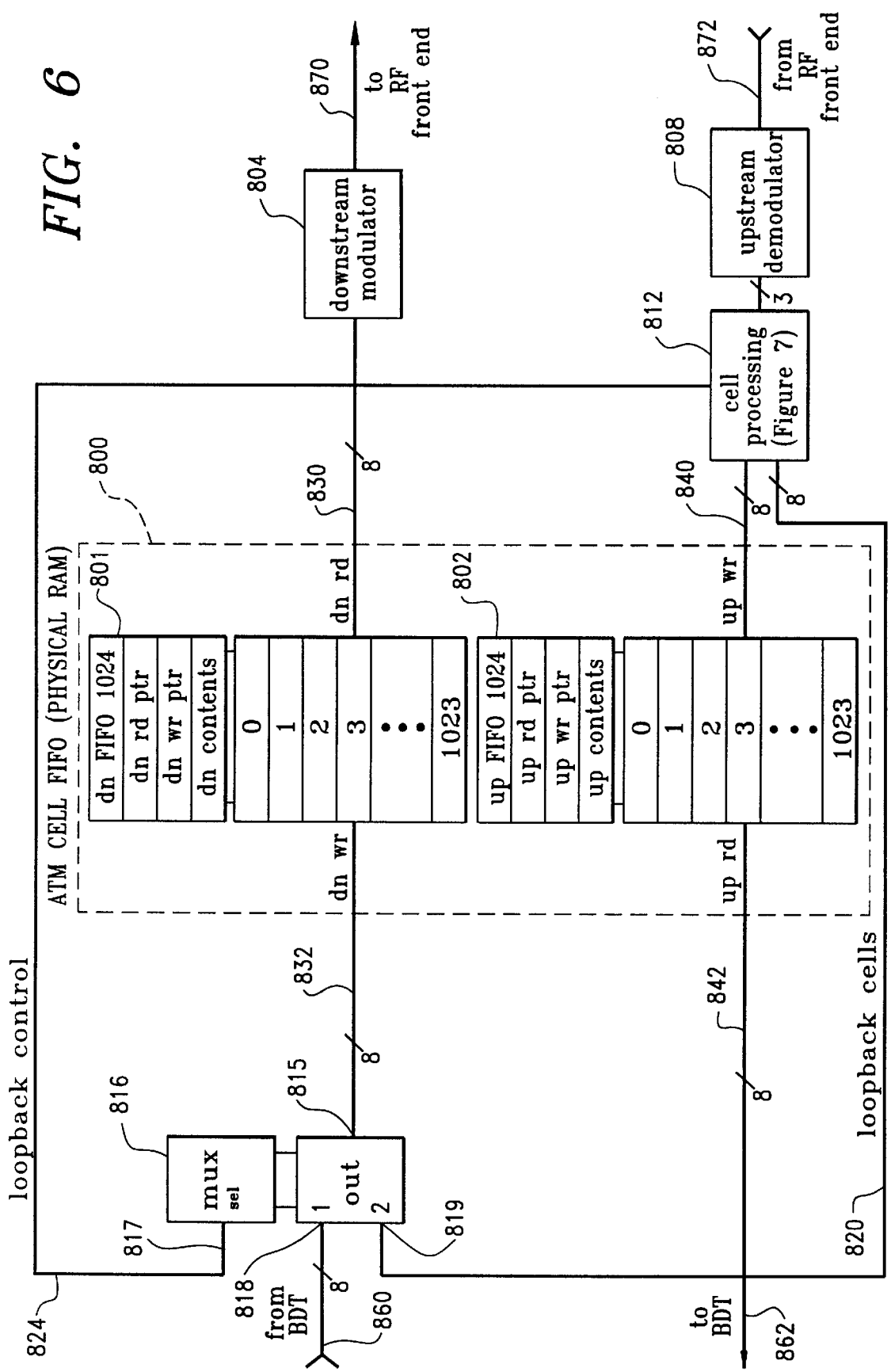
FIG. 6 shows the First In First Out (FIFO)s, multiplexing, cell processing, and downstream and upstream modem functions within a Broadband Interface Unit (BIU)
Figure 7:
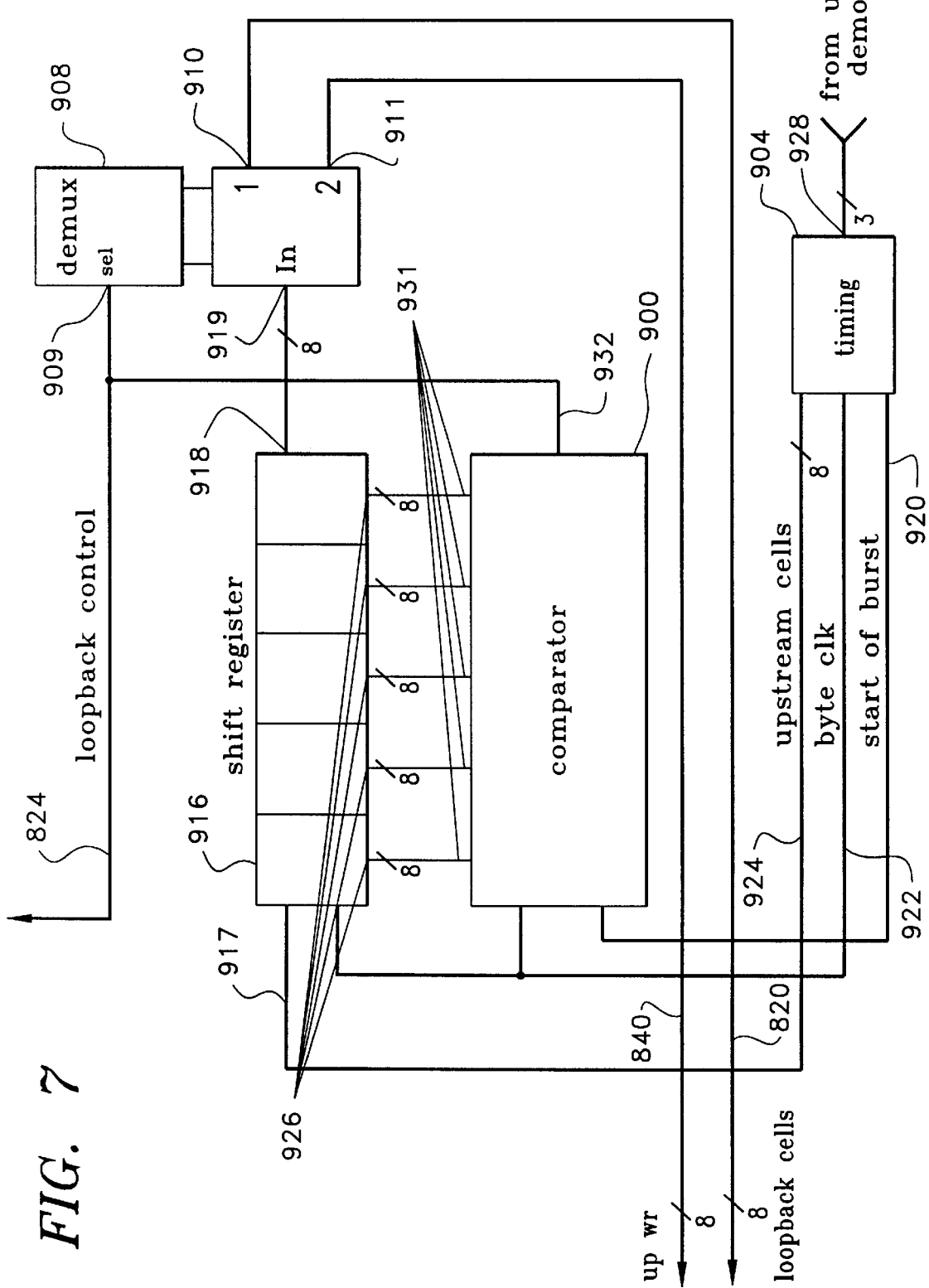
FIG. 7 shows the details of the cell processing portion of the BIU.

The actual functions of routing are illustrated in FIGS. 6 and 7. FIG. 6 illustrates the First In First Out (FIFO), multiplexing, cell processing, and downstream and upstream modem functions within the BIU, while FIG. 7 shows the details of the cell processing portion of the BIU.

Referring to FIG. 6, cells arrive from the home (250) over the subscriber coaxial cable network and radio frequency (RF) front end at the input from the RF front end (872) of the upstream demodulator (808) and are passed to the cell processing block (812). The upstream demodulator (808) recovers the data from the modulated FTTC return carrier (500) and recovers the symbol timing and carrier phase as well as determining the values of each bit in the demodulated data stream. The cell processing block performs the actual routing by determining if cells are to be routed back to the home (250) via the 8 bit wide loopback cell bus (820) or if they are to be routed to the BDT (100).

In the event that they are to be routed to the BDT (100) the cells appear on the 8 bit wide upstream write bus (840) to the upstream FIFO (802) where they are buffered until read out on the 8 bit wide upstream read bus (842) and transmitted to the BDT on the output to BDT (862) which goes to the appropriate circuitry for further multiplexing and transmission on the optical fiber (200).

When the loopback control signal (824) is low (a logical '0') the multiplexor (816) selects cells from the input from the BDT (860) which appear at multiplexor input 1 (818) and lets them pass to the multiplexor output (815) where they are directed to the downstream FIFO (801) via the 8 bit wide down write bus (832).

In the event that the cells are to be routed back to the home, as determined by the cell processing block (812) the cells appear on the 8 bit wide loopback cell bus (820) and the loopback control signal (824) goes to a logical '1' state. The loopback control signal (824) is connected to the multiplexor selector input (817) of the multiplexor (816). When the loopback control signal (824) is high (a logical '1') cells on the 8 bit wide loopback cell bus (820), which is connected to multiplexor input 2 (819), appear at the multiplexor output (815) on the 8 bit wide down write bus (832) of the downstream FIFO (801). The cells are written into the downstream FIFO (801) and read out onto the 8 bit wide down read bus (830). The cells are then modulated onto the FTTC forward carrier (520) at the downstream modulator (804). The output of the downstream modulator (870) is further connected to the RF front end, which performs the appropriate signal processing to place the cells on the subscriber coaxial cable network on the FTTC forward carrier (520).

There are several advantages to using ATM cell FIFOs (800) for buffering upstream and downstream data in the BIU (120) as shown in FIG. 6. One advantage is that the FIFOs can be easily realized in Random Access Memory (RAM) in an Application Specific Integrated Circuit by partitioning the RAM to form multiple FIFOs. The FIFOs are formed by utilizing pointers which indicate the place in memory where the last read and last write are, as well as a register indicating the amount of data (contents) in the FIFO.

Operation of the FIFO is illustrated in Table I which describes the actions of the read and write pointers and contents register for read, write and simultaneous read and write operations. The FIFO contents registers can be used to determine how full the FIFOs are, and indicate the extent to which the bandwidth is being utilized. In the event that the contents of the downstream FIFO (801) is below a specified level for a period of time on the order of milliseconds, it is possible to allocate bandwidth for in-home communications. In this manner the BNU (110) issues grants (650) to devices (140) based on examining the FIFOs. The contents registers are also used to prevent an overflow or underflow condition which is a result of an attempt to write more into the FIFO than there is memory space for (overflow) or an attempt to read data from the FIFO which has not yet been written (underflow). The dimensions of the FIFOs will depend on various system parameters including the burstiness of the transmissions on the network and the amount of jitter in the data stream. For many networks, a 1 by 1024 byte FIFO will be adequate for the downstream and the upstream FIFOs.

In the operation of the FIFOs it is generally understood that the addressing is circular in that incrementing past the last available address results in the next available address being zero, while decrementing past zero results in the highest FIFO address. This is easily accomplished using circular binary counters formed by discarding the carry bit. The general construction of FIFOs and the control logic associated with the FIFO is well understood by those skilled in the art.

TABLE I

Operations for FIFO pointers

| Operation/register | write pointer | read pointer | contents register |
|---|---|---|---|
| read operation | no action | increment | decrement |
| write operation | increment | no action | increment |
| both | increment | increment | no action |

Routing of the cells takes place in the cell processing block (812) which is further illustrated in FIG. 7. Cells arrive from the upstream demodulator (808) at the input from the upstream modulator (928) of the timing block (904) on a three bit wide bus which contains the bits in the data stream, as well as a bit clock and a start of burst signal. The timing block (904) generates a byte clock signal (922), assures that the byte clock signal (922) is synchronized with the start of burst signal (924), and removes any prepends or appends to assure that the signals that leave the timing block are ATM cells such as those shown in FIG. 2. The timing block (904) contains the necessary digital logic to perform these operations.

The upstream cell bus (924) receives the cells from the timing block and provides these cells to the shift register (916) at the shift register input (917). The bytes of the cells are clocked out in parallel from the shift register (916) by the byte clock signal (922) which is also connected to the shift register (916). Bytes of cells which appear at the shift register parallel outputs (926) are received at the comparator inputs (931). The comparator (900) also receives the byte clock signal (922) and start of burst signal (920). The comparator (900) contains a counter which is used internally to determine which received bytes correspond to the header of the ATM cell (bytes 1–5) as shown in FIG. 2.

The comparator, upon receiving the 5 bytes which comprise the ATM cell header (the GFC (400), VPI (410), VCI (420), PT (430), CLP (440) and HEC (450) fields) determines if the cell is to be routed back to the home (250) over the subscriber coaxial cable network or if it should be sent upstream to the BDT (100). This routing is performed by comparing selected bits in the cell header with a stored pattern. In a preferred embodiment, the only bits that are utilized for the comparison are the VPI field (410) which are compared with the decimal number m, which corresponds to VPI=m. The value of m is placed in the comparator (900) by writing from a microprocessor in the BNU to a register in the comparator (900), or by hardwiring the value m in the ASIC at the time of fabrication. Simple combinatorial logic in the comparator is used to determine when the VPI field (410) in the arriving cell is equal to m, and the output of the comparator is used in conjunction with a counter to set the loopback control signal (824) high at the output of the comparator (932) at the time when the bytes of the cell appear at the shift register output (918). The other fields in the cell header can be masked off so that no comparison is made with bits other than those in the VPI field (410).

The cell appears at the demultiplexor (908) which has a demultiplexor input (912), a demultiplexor selector input (909), a first demultiplexor output (910), and a second demultiplexor output (911). When the loopback control signal (824) is high (a logical '1') the cell appears at the first multiplexor output (910) which is connected to the 8 bit wide loopback cell bus (820) which is in turn connected to the multiplexor (816) as shown in FIG. 6. When the loopback control signal is low (a logical '0') the cell appears at the second demultiplexor output (911) which is connected to the 8 bit wide upstream write bus (840) which is in turn connected to the upstream FIFO (802) as illustrated in FIG. 6.

Although the present invention has been described in considerable detail with reference to certain preferred versions thereof, other versions are possible. The goal of the invention as a method and apparatus for the connection of devices within the home remains the same however. As an example of the usage of the invention, it is possible to connect customer premise equipment in the home such as a television settop and a personal computer to a printer, allowing a television settop to transmit to a number of televisions in the home, or allowing a personal computer to connect to one or more televisions in the home. Therefore the spirit and scope of the appended claims should not be limited to the description of the preferred versions contained herein.

I claim:

1. In a telecommunications access platform capable of providing local data services simultaneously with telecommunications services from a Public Switched, Telecommunications Network (PSTN), a method for in-home communications which does not necessitate use of said Public Switched Telecommunications Network (PSTN), said method comprising:

(a) receiving a first signal from said Public Switched Telecommunications Network (PSTN) at a first terminal;

(b) transmitting said first signal from said first terminal to a second terminal via a fiber optic link;

(c) receiving said first signal at said second terminal;

(d) transmitting said first signal to a subscriber residence over a transmission medium;

(e) receiving said first signal at said subscriber residence;

(f) transmitting a second signal from a first in-home device in said subscriber residence over said transmission medium, wherein said second signal contains a routing indicator;

(g) receiving said second signal from said first in-home device at said second terminal;

(h) routing said second signal from said first in-home device within said second terminal for subsequent transmission to a second in-home device, wherein said routing is determined by said routing indicator, and wherein said routing does not make use of said Public Switched Telecommunications Network (PSTN);

(i) transmitting said second signal from said second terminal over said transmission medium to said second in-home device; and (j) receiving a second signal from said second terminal over said transmission medium at said second in-home device.

2. The method described in claim 1 wherein said transmission medium is a twisted pair cable.

3. The method described in claim 1 wherein said medium is a subscriber coaxial cable network comprising at least one coaxial cable and at least one splitter.

4. In a telecommunications access platform capable of providing local data services simultaneously with telecommunications services from a Public Switched Telecommunications Network (PSTN), an apparatus for in-home communications which does not necessitate use of said Public Switched Telecommunications Network (PSTN), said apparatus comprising:

(a) means for receiving a first signal from said Public Switched Telecommunications Network (PSTN) at a first terminal;

(b) means for transmitting said first signal from said first terminal to a second terminal via a fiber optic link;

(c) means for receiving said first signal at said second terminal;

(d) means for transmitting said first signal to a subscriber residence over a transmission medium;

(e) means for receiving said first signal at said subscriber residence;

(f) means for transmitting a second signal from a first in-home device in said subscriber residence over said transmission medium, wherein said second signal contains a routing indicator;

(g) means for receiving said second signal from said first in-home device at said second terminal;

(h) means for routing said second signal from said first in-home device within a second terminal for subsequent transmission to a second in-home device, wherein said routing is determined by said routing indicator, and wherein said routing does not make use of said Public Switched Telecommunications Network (PSTN);

(i) means for transmitting said second signal from said second terminal over said transmission medium to said second in-home device; and (j) means for receiving said second signal from said second terminal over said transmission medium at said second in-home device.

5. The apparatus described in claim 4 wherein said transmission medium is a twisted pair cable.

6. The apparatus described in claim 4 wherein said medium is a subscriber coaxial cable network comprising at least one coaxial cable and at least one splitter.

7. In a telecommunications access platform capable of providing local data services simultaneously with telecommunications services from a Public Switched Telecommunications Network (PSTN), a method for in-home communications which does not necessitate use of said Public Switched Telecommunications Network, said method comprising:

(a) receiving a first signal from said Public Switched Telecommunications Network (PSTN) at a first terminal;

(b) transmitting said first signal from said first terminal to a second terminal via a fiber optic link;

(c) receiving said first signal at said second terminal;

(d) transmitting said first signal to a subscriber residence over a transmission medium;

(e) receiving said first signal at said subscriber residence;

(f) transmitting a second signal from a first in-home device in said subscriber residence onto a subscriber coaxial cable network in a time slot wherein said subscriber coaxial cable network is comprised of at least one coaxial cable and at least one splitter;

(g) receiving said second signal from said first in-home device over said subscriber coaxial cable network at a said second terminal;

(h) routing said second signal from said first in-home device within said second terminal for subsequent transmission, wherein said routing is determined by said time slot, and wherein said routing does not make use of said Public Switched Telecommunications Network (PSTN);

(i) transmitting said second signal from said second terminal to a second in-home device over said subscriber coaxial cable network; and (j) receiving said second signal from a broadband network unit over said subscriber coaxial cable network at said second in-home device.

8. The method described in claim 7 wherein said second signal is transmitted from said second terminal to said second in-home device using time division multiplexing.

9. In a telecommunications access platform capable of providing local data services simultaneously with telecommunications services from a Public Switched Telecommunications Network (PSTN), an apparatus for in-home communications which does not necessitate use of said Public Switched Telecommunications Network (PSTN), said apparatus comprising:

(a) means for receiving a first signal from said Public Switched Telecommunications Network (PSTN) at a first terminal;

(b) means for transmitting said first signal from said first terminal to a second terminal via a fiber optic link;

(c) means for receiving said first signal at said second terminal;

(d) means for transmitting said first signal to a subscriber residence over a transmission medium;

(e) means for receiving said first signal at said subscriber residence;

(f) means for transmitting a second signal from a first in-home device in said subscriber residence onto a subscriber coaxial cable network in a time slot wherein said subscriber coaxial cable network is comprised of at least one coaxial cable and at least one splitter;

(g) means for receiving said second signal from said first in-home device over said subscriber coaxial cable network at a said second terminal;

(h) means for routing said second signal from said first in-home device within said second terminal for subsequent transmission, wherein said routing is determined by said time slot, and wherein said routing does not make use of said Public Switched Telecommunications Network (PSTN);

(i) means for transmitting said second signal from said second terminal to a second in-home device over said subscriber coaxial cable network; and (j) means for receiving said second signal from a broadband network unit over said subscriber coaxial cable network at said second in-home device.

10. The apparatus described in claim 7 wherein said second signal is transmitted from said broadband network unit to said second in-home device using time division multiplexing.

11. In a telecommunications access platform capable of providing local data services simultaneously with telecommunications services from a Public Switched Telecommunications Network (PSTN), a method for in-home communications which does not necessitate use of said Public Switched Telecommunications Network (PSTN), said method comprising:

(a) receiving a first signal from said Public Switched Telecommunications Network (PSTN) at a first terminal;

(b) transmitting said first signal from said first terminal to a second terminal via a fiber optic link;

(c) receiving said first signal at said second terminal;

(d) transmitting said first signal to a subscriber residence over a transmission medium;

(e) receiving said first signal at said subscriber residence;

(f) transmitting a second signal having asynchronous transfer mode cells containing information from a first in-home device in said subscriber residence onto a subscriber coaxial cable network comprising at least one coaxial cable and at least one splitter located in said subscriber residence, wherein said second signal is a digital signal modulated onto a first carrier frequency;

(g) receiving said second signal from said first in-home device over said subscriber coaxial cable network at a said second terminal;

(h) routing said second signal from said first in-home device within said second terminal for subsequent transmission, wherein said routing does not make use of said Public Switched Telecommunications Network (PSTN);

(i) transmitting said second signal from said second terminal to a second in-home device over said coaxial cable wherein said transmission is a digital signal modulated onto a second carrier frequency; and (j) receiving said second signal from said second terminal over said coaxial cable at said second in-home device in said subscriber residence.

12. The method described in claim 11 wherein said second signal from said first in-home device is transmitted to said second terminal using a time division multiple access protocol.

13. The method described in claim 11 wherein said second signal is transmitted from said second terminal to said second in-home device using time division multiplexing.

14. The method described in claim 11 wherein said first frequency is in the range of 5–50 MHz and said second frequency is in the range of 50–1000 MHz.

15. The method described in claim 12 wherein said first frequency and said second frequency are in the range of 5–50 MHz.

16. In a telecommunications access platform capable of providing local data services simultaneously with telecommunications services from a Public Switched Telecommunications Network (PSTN), an apparatus for providing in-home communications which does not necessitate use of said Public Switched Telecommunications Network (PSTN), said apparatus comprising:

(a) means for receiving a first signal from said Public Switched Telecommunications Network (PSTN) at a first terminal;

(b) means for transmitting said first signal from said first terminal to a second terminal via a fiber optic link;

(c) means for receiving said first signal at said second terminal;

(d) means for transmitting said first signal to a subscriber residence over a transmission medium;

(e) means for receiving said first signal at said subscriber residence;

(f) means for transmitting a second signal having asynchronous transfer mode cells containing information from a first in-home device in said subscriber residence onto a subscriber coaxial cable network comprising at least one coaxial cable and at least one splitter located in said subscriber residence, wherein said second signal is a digital signal modulated onto a first carrier frequency;

(g) means for receiving said second signal from said first in-home device over said subscriber coaxial cable network at a said second terminal;

(h) means for routing said second signal from said first in-home device within said second terminal for subsequent transmission, wherein said routing does not make use of said Public Switched Telecommunications Network (PSTN);

(i) means for transmitting said second signal from said second terminal to a second in-home device over said coaxial cable wherein said transmission is a digital signal modulated onto a second carrier frequency; and (j) means for receiving said second signal from said second terminal over said coaxial cable at said second in-home device in said subscriber residence.

17. The apparatus described in claim 16 wherein said second signal from said first in-home device is transmitted to said second terminal using a time division multiple access protocol.

18. The apparatus described in claim 16 wherein said second signal is transmitted from said second terminal to said second in-home device using time division multiplexing.

19. The apparatus described in claim 16 wherein said first frequency is in the range of 5–50 MHz and said second frequency is in the range of 50–1000 MHz.

20. The apparatus described in claim 16 wherein said first frequency and said second frequency are in the range of 5–50 MHz.

* * * * *